United States Patent [19]

Quinton et al.

[11] Patent Number: 4,720,923
[45] Date of Patent: Jan. 26, 1988

[54] REMOTE CENTER COMPLIANCE SYSTEM

[75] Inventors: Brian P. Quinton, Hayling Island; Garry E. Scott, Fareham, both of United Kingdom

[73] Assignee: International Business Machines Corporation, Armonk, N.Y.

[21] Appl. No.: 852,265

[22] Filed: Apr. 15, 1986

[30] Foreign Application Priority Data

Apr. 17, 1985 [EP] European Pat. Off. ........ 85302687.0

[51] Int. Cl.⁴ .............................................. G01B 5/25
[52] U.S. Cl. ....................................... 33/644; 33/520; 901/45
[58] Field of Search ............. 33/169 R, 185 R, 172 C, 33/644, 520; 901/37, 31, 45, 38, 39

[56] References Cited

U.S. PATENT DOCUMENTS

| 4,179,783 | 12/1979 | Inoyama et al. | 901/32 X |
| 4,379,363 | 4/1983 | Whitney | 33/169 C |
| 4,414,750 | 11/1983 | De Fazio | 33/169 C |
| 4,458,424 | 7/1984 | Cutkosky et al. | 33/169 C |
| 4,571,148 | 2/1986 | Drazan | 901/45 X |

Primary Examiner—William D. Martin, Jr.

[57] ABSTRACT

A remote center compliance system for compliantly connecting a robot support arm interface to an operator device interface comprises at least three gas-tight spring bellows interconnecting the interfaces and a connection means for connecting the interiors of the bellows in common to an external variable pressure source. The compliance of the system, both rotational and lateral, may be controlled by the applied pressure. The bellows may also be evacuated so that their resultant collapse locks the support structure and operator device together.

8 Claims, 6 Drawing Figures

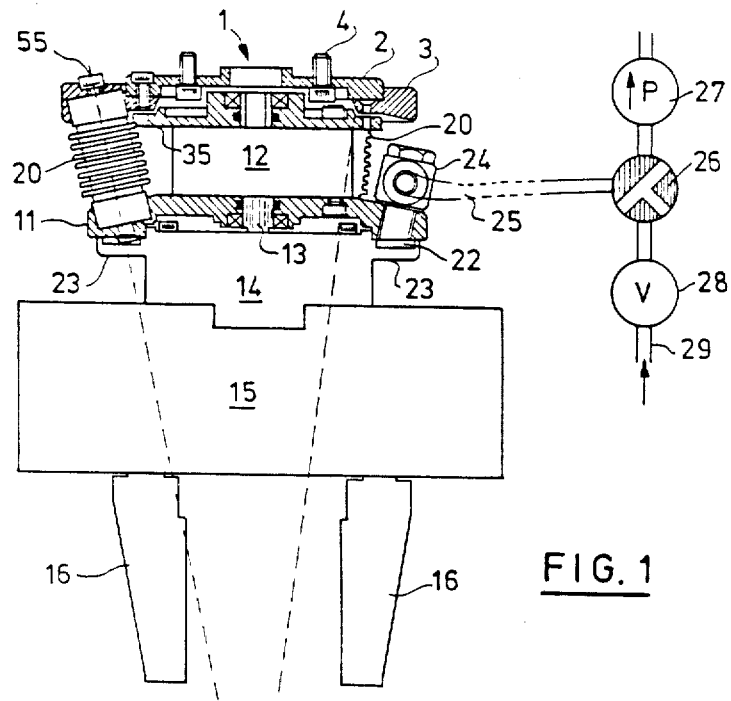
FIG. 1
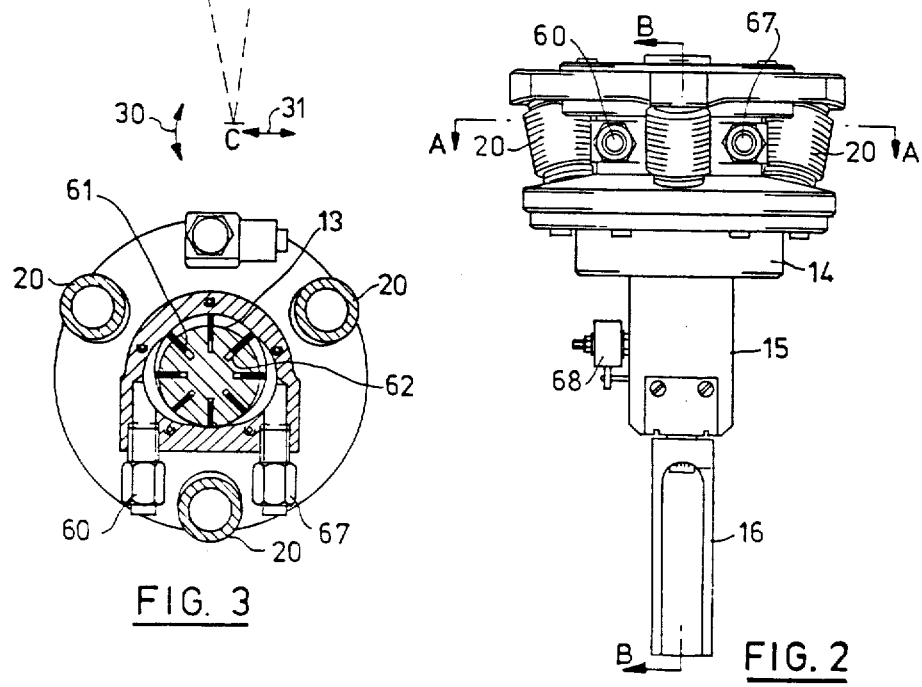
FIG. 3
FIG. 2

REMOTE CENTER COMPLIANCE SYSTEM

FIELD OF THE INVENTION

The invention relates to remote center compliance systems.

BACKGROUND ART

In the field of roboticsa nd automatic assembly tooling, it is often necessary to provide some compliance when fittng two parts together or when engaging a tool with a complementarily shaped aperture. This need arises because of the tolerances in gripping and positioning capability of a robot arm and the dimensional tolerances of the members being positioned. The use of excessive force to engage two imperfectly aligned members can lead to damage to the members or assembly tooling. The provision of compliance allows a degree of imprecision in the positioning movements and is usually cheaper than providing additional sensors to enable finer position control.

Simple compliance, in the sense of general flexibility of mechanical connections, is not, however, desirable, as this can lead to even greater misfits than the original misalignment. For example, a misaligned peg can be tilted even further off the axis of a chamfered bore by the moment of the insertion force about the edge of the bore.

In U.S. Pat. Nos. 4,098,001, 4,155,169 and 4,276,697 so-called "remote center compliance" devices are shown for interconnecting a support structure, e.g. a robot arm, to an operator device, e.g. a gripper. The devices shown are mechanical linkages of cage-like appearance with various degress of flexibility in the links. This flexibility and the geometry of the links produces a "center of compliance", remote from the compliance device, and located nearer to the anticipated point of contact of the parts to be positioned. The center of compliance is such that a pure lateral force applied at the center of compliance will produce only a lateral translation without rotation and a pure turning force (moment) applied about the center of compliance will cause only rotation about the center with no translational movement. In both cases, movement is resisted by a controlled restoring force (or stiffness).

All of the devices described have, in common, three circumferentially spaced angled links, all pointing at the same remote center (not necessarily the center of compliance). These provide rotational compliance. In addition, either additional axially extending links or deformability of the structure supporting the links is provided to achieve lateral compliance as well. Such structures are relatively complex.

The devices described in U.S. Pat. Nos. 4,098,001 and 4,155,169 are also described by Samuel H. Drake in a doctoral thesis submitted to the Massachusetts Institute of Technology entitled "Using compliance in lieu of sensory feedback for automatic assembly" (No T-657, September 1977, published by The Charles Stark Draper Laboratory, Inc). In this thesis, at pages 136 and 137, some further modifications are illustrated including a device of simpler construction using only thick, angled, elastomeric elements that deform in both shear and compression/extension. Even this device, in common with those of the above referenced patents has the disadvantage that the stiffnesses of the various compliant motions are fixed by the materials used. There is no provision for varying the compliance for different tasks nor for removing it entirely when the robot is not in a registration/insertion mode of operation.

In U.S. Pat. No. 4,458,424, a remote compliance system is shown which employs four elastomeric spheres between a manipulator arm and a tool. These can be pressurized by fluid from a controllable supply to vary the center of compliance. The spheres resist longitudinal compression only, tension being resisted by an associated system of angled cables. Lateral movement is resisted by further spheres trapped between laterally spaced wall sections of the two devices.

Unrelated to the above types of compliant device, there is also known, from U.S. Pat. No. 4,078,671, a type of pickup device employing two tubular sections lined by means of a bellows. One of the tubular sections terminates alternatively, in either a vacuum head or an inflatable sock (designed for internal pickup). When not actually gripping an object, the tubular sections are loosely jointed together by the bellows and the pickup head is free to move in all vertical planes through the axis of the upper tube. This is said to make initial registration of the pickup head with an object to be picked up a wide tolerance operation. When vacuum or pressure is applied (depending on the type of head), the bellows either collapses or expands causing the object to be picked up and also causing alignment of the two tubes in a fixed relative position, thus removing any compliance. The object may then be moved to an assembly station by the pickup and assembled onto a mating part. The purpose of this device, unlike those discussed above, is to remove compliance at the point of assembly, in the interests of precision, by locking the two portions of the pickup together. In neither its locked not its free states does this device solve the problems of excessive force and damage caused by imperfect alignment.

The use of a system of jacks or bellows formed to connect a manipulator arm and tool is shown in European published patent application Ser. No. 0113145-A1. Multiple sets of jacks with different orientations are filled with oil and pressurized by means of plungers and the like to determine their degree of extension. Essentially, the arrangement provides controllable fine positioning of the tool with respect to the manipulator arm and is not a remote center compliance system.

SUMMARY OF THE INVENTION

Accordingly, the present invention provides a remote center compliance system for compliantly connecting a support arm interface to an operator device interface in which the system restricts movement at a center remote from the system of the operator device or of an object held thereby to certain directions, each such movement being resisted by a respective stiffness, the system comprising at least three gas-tight spring bellows interconnecting the support arm interface and the operator device interface, and connection means for connecting the interiors of the bellows in common to an external variable pressure source whereby the gas pressure within said bellows may be varied so as to vary the compliance of the system.

With such a system, it is possible to vary the overall compliance of the system and also the relative values of the rotational and lateral compliance thus achieving greater flexibility and utility than with prior remote center compliance systems.

Preferably, portions of the operator device and of the support arm interface are adapted to interfit (e.g. by tapering) upon a sufficient change in length of the bellows as a result of a selectively applied pressure variation so as to lock the support structure and operator device together and remove any compliance. Such locking is useful in cases where it is desirable to remove compliance temporarily, for example during a high speed move of a robot arm. The presence of compliance, however slight, during such moves can result in the object being gripped or the compliance device itself being subjected to excessive shocks. Consequent knocking of loosely held parts together is a potential source of debris which could contaminate a clean-room assembly area.

Specifically, it is preferred that the support arm interface and the operator device are brought into engagement by a partial collapse of the bellows. In this case, such locking can be achieved by connecting the system to a vacuum source. To achieve maximum flexibility in use of the compliance it is preferred that the system include a selectively variable pressure source, a vacuum source and switch valve means for selectively connecting either the variable pressure source or the vacuum source to the connection means.

Although each bellows of a compliance system according to the invention could be independently connected to a common pressure source, it is preferred that the connection means comprise a duct interconnecting the interiors of the bellows and a connector adapted to connect the duct to an external variable pressure source. Specifically, it is preferred that the support arm and operator device interfaces each comprise plates to which the bellows are fixed at respective ends. A channelled flange around the operator device, can then cooperate with the operator device interface plate to define the duct interconnecting the interior of the bellows.

With the two plate structure outlined above, the operator device can conveniently include a motor housed between the plates and an output mechanism outside the plates. Such a motor may be either fluid driven or electrically driven.

Finally, it is a preferred feature of the invention that the bellows are of corrugated spring metal and of cylindrical form and that their axes lie on different radii of a sphere, the center of which is in the vicinity of said remote center of compliance.

BRIEF DESCRIPTION OF THE DRAWINGS

The invention will now be described, by way of example only, with reference to a preferred embodiment thereof, as illustrated in the accompanying drawings in which:

FIG. 1 is a simplified part-sectional view of a remote center compliance system according to the invention, with various associated mechanism illustrated schematically and in outline;

FIG. 2 is a side elevation of the compliance system of FIG. 1;

FIG. 3 is a cross-section taken on the line A—A of FIG. 2;

DETAILED DESCRIPTION OF THE INVENTION

Figure 4:
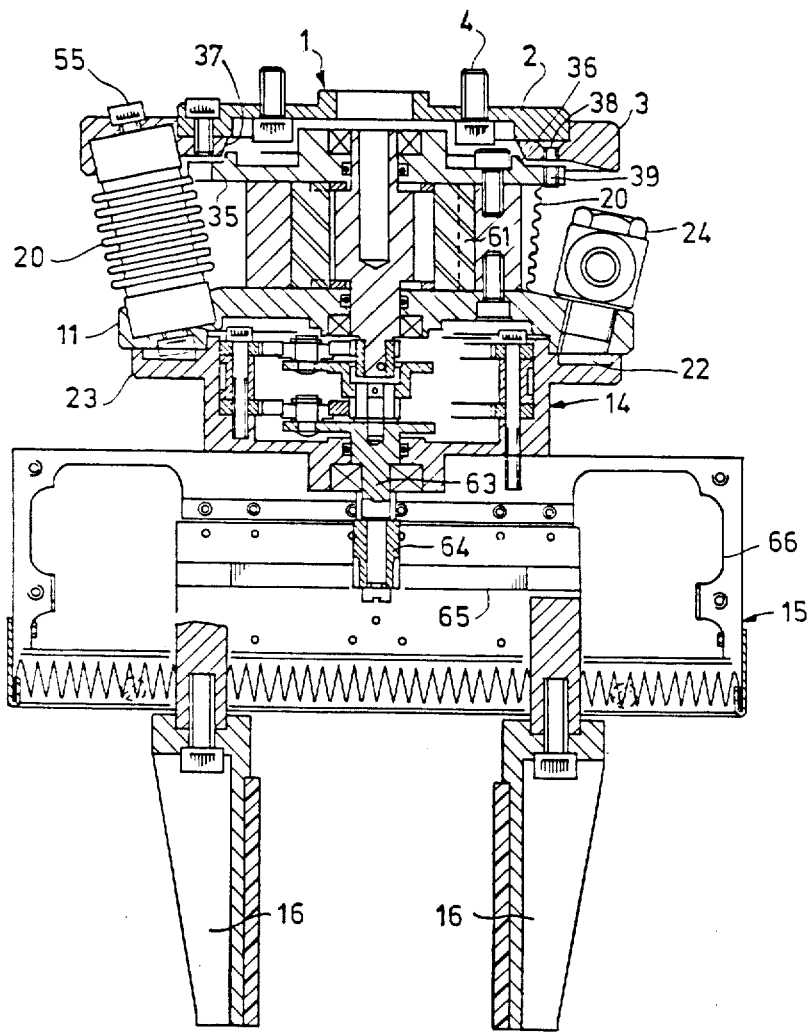
FIG. 4 is a detailed cross-section taken on the line B—B of FIG. 2.

In FIG. 1, there is illustrated a remote center compliance system in which a robot support arm, not shown except for an adapter or interface assembly 1, is compliantly connected to an operator device interfce plate 11. The operator device, shown largely in outline, is a gripper assembly comprised by motor 12, drive shaft 13, gearbox 14, rack and pinion drive 15 and movable jaws 16. Internal details of the gripper assembly are illustrated in FIGS. 3 and 4 but are not relevant to an explanation of the compliance system as such.

Figure 5:
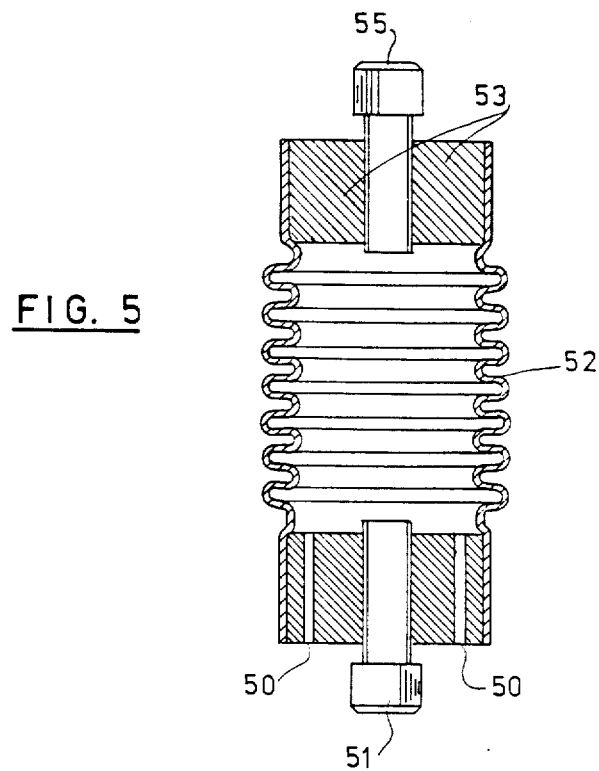
FIG. 5 is a cross-section of one of the bellows employed in the system of FIGS. 2 to 4.
Figure 6:
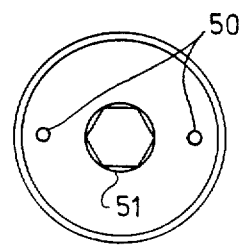
FIG. 6 is an end view of the bellows illustrated in FIG. 5.

In fact, the interface plate 11 forms the lower portion of the housing of motor 12 and supports the motor shaft 13 in bearings, as illustrated. The plate 11 serves to mount the entire gripper assembly on the robot interface assembly 1. This assembly consists of a central plate 2 surrounded by a fixed ring 3. Bolts 4 are provided to connect the plate 2 to the robot arm (not shown). The two interfaces 1 and 11 are connected by three spring metal bellows 20 of cylindrical form. The bellows, one of which is illustrated in more detail in FIGS. 5 and 6, are bolted at each end to the ring 3 and plate 11 respectively. They are set at an angle to the vertical axis of the system and are directed towards a remote center of compliance C, as shown in FIG. 1.

When bolted to ring 3 and plate 11, the bellows 20 are gas-tight, except for two bores 50 in their lower end as shown in FIGS. 5 and 6. These bores register with two further bores (not visible) in plate 11 to allow communication with an annular duct 22 formed by the lower surface of interface plate 11 and an upturned flange 23 surrounding the housing of gearbox 14.

Duct 22 leads to a connector 24 which connects it to hose 25. As shown schematically in FIG. 1, the hose 25 may be connected by way of a two-way switch valve 26 to either a vacuum pump 27 or to a control valve 28 for controlling the pressure from a pressure line 29.

When the robot and gripper assembly 1 perform an operation which requires compliance, the switch valve 26 connects the line 25 to the pressure line 29 via control valve 28. If the valve is set to a pressure above ambient, the bellows 20 become pressurised and expand.

The geometrical arrangement of the bellows is such as to define a remote center of compliance C, FIG. 1. In the unpressurised ambient state of the bellows, both the rotational compliance (arrow 30) and lateral compliance (arrow 31) are maximised and are essentially determined by the spring properties of the metal of which the bellows are constructed. In the illustrated arrangement, in which the bellows are constructed of phosphor-bronze, the maximum compliance is ±1.0 mm laterally and ±2.0 degress rotationally. The base stiffnesses (lateral and rotational) at ambient pressure are determined by the material and design of the bellows. By increasing the pressure in the bellows these stiffnesses can be increased. In the system illustrated, stiffness can be varied by approximately 25% in response to pressures of around 50 psi. Clearly, intermediate pressures will produce intermediate values of stiffness. It has also been found that the ratio of lateral to rotational stiffness is altered under pressure, the rotational stiffness increasing faster than the lateral stiffness. This is particularly useful for different types of assembly task, for example, where the point of contact of parts to be fitted is not at the center of compliance.

When moving the arm between locations, e.g. from a parts store to an assembly station, it is desirable to remove compliance, particularly in a clean-room environment. This may be achieved by connecting the bellows to vacuum pump 27 via switch valve 26. The bellows contract and cause a motor cap plate 35 to lock against the underside of ring 3 of the robot arm interface. Locking is assisted by providing the two parts with interfitting tapered surfaces 36 and 37.

In some applications it may be desirable to remove compliance altogether from the system both for movement and for operation of the gripper. For this purpose, three countersunk bolt holes are provided in the ring 3, one of which is shown at 38 in FIG. 4. Corresponding tapped bores 39 in plate 35 permit the gripper assembly and robot support arm interface assembly 1 to be bolted firmly together thus preventing any relative movement.

The structure of the bellows 20 is shown in detail in FIGS. 5 and 6. The outer material of the bellows is a phosphor bronze tub 52 formed into a corrugated shape. The tube is closed at its upper end by an annular brass plug 53 having a threaded bore for receiving a mounting bolt 55. At its opposite end, the tube is formed in a cap around a similar arrangement of ring and insert around bolt 51, but additionally including bores 50 as explained above.

The detailed construction and operation of the gripper mechanism as illustrated in FIGS. 2, 3 and 4 is not strictly relevant to the operation of the compliance system for attaching the gripper, but will now be briefly described, for completeness.

The gripper assembly is driven by motor 12 which is a vane type of motor driven by a high pressure air source, not shown. High pressure air entering the motor at connector 60 is directed onto a series of eight vanes 61 which run in an eccentric housing. The vanes 61 have limited radial freedom of movement within slots 62 formed in an upper portion of motor shaft 13. The output shaft 13 is connected to the input of the gearbox 14 which is a two-stage epicyclic gearbox having a speed reduction of 36:1. The output shaft 63 of the gear box carries a pinion 64 engaged with the teeth of two parallel spaced racks 65 on either side of the pinion. Only one rack 65 is visible in FIG. 4. Each rack is mounted for linear movement as part of a movable carriage 66, which is also connected to a respective gripper jaw 16. Thus the jaws 16 can be moved towards and away from each other by operation of the motor 12.

The grip force applied as jaws 16 approach and grip a part can be controlled by control of air pressure and speed of movement can be reduced by restricting the exhaust from outlet connector 67. If air pressure is lost, grip can be maintained on lightweight parts because the combination of the high gear box ratio and the vane motor is sufficient to resist movement of the jaws. Finally, closed loop positioning control may be effected by employing a potentiometer 68 connected to one of the racks.

We claim:

1. A variable remote center compliance system for compliantly connecting between a pair of interfaces in which the system restricts movement a a remote center to certain directions, each such movement being resisted by a respective stiffness, the system comprising:
    a support arm;
    an interface forming part of said support arm,
    an operator device,
    a further interface forming part of said operator device,
    at least three gas-tight spring bellows interconnecting said support arm interface and said operator device interface,
    connection means for connecting the interiors of said bellows in common,
    a selectively variable gas pressure source and a vacuum source,
    and switch valve means for selectively connecting between the variable pressure source and the vacuum source to said connecting means whereby the gas pressure in said bellows may be varied so as to vary the compliance of the system and the vacuum may be applied to remove any compliance.

2. A compliance system as claimed in claim 1 in which said connection means comprises a duct interconnecting the interiors of said bellows and a connector adapted to connect said duct to said external variable pressure source.

3. A compliance system as claimed in claim 1 in which portions of said operator device interface and portions of said support arm interface are adapted to interfit upon a sufficient change in length of aid bellows as a result of a selectively applied vacuum variation so as to lock said support-arm and said operator-device interface together to thereby remove any compliance.

4. A compliance system as claimed in claim 3 in which said support arm interface and said operator device interface are brought into interfitting engagement by a partial collapse of said bellows.

5. A compliance system as claimed in claim 3 in which said portions of said operator device interface and of said support arm interface adapted to interfit are tapered.

6. A compliance system as claimed in claim 1 in which said support arm interface comprises a plate to which said bellows are fixed at the same respective ends and said operator device interface comprises another plate to which said bellows are fixed at their opposite respective ends.

7. A compliance system as claimed in claim 6 wherein said connectign means includes a duct formed by a channeled flange around said operator device, which co-operates with said operator device interface plate to define said duct interconnecting the interiors of said bellows.

8. A compliance system as claimed in claim 1 in which said bellows are made of corrugated spring metal and are of cylindrical form and the axes of said bellows lie on different radii of a sphere.

* * * * *